METHOD OF RECORDING A MULTIPLE OF ELECTRICAL SIGNALS

Filed Jan. 30, 1959

INVENTOR.
ZACK D. REYNOLDS
BY
[signature]
[signature]
ATTORNEYS

United States Patent Office 3,068,454

Patented Dec. 11, 1962

3,068,454

METHOD OF RECORDING A MULTIPLE OF ELECTRICAL SIGNALS

Zack D. Reynolds, San Diego, Calif., assignor to the United States of America as represented by the Secretary of the Navy Filed Jan. 30, 1959, Ser. No. 790,305
7 Claims. (Cl. 340—174.1)
(Granted under Title 35, U.S. Code (1952), sec. 266)

Figure 1:
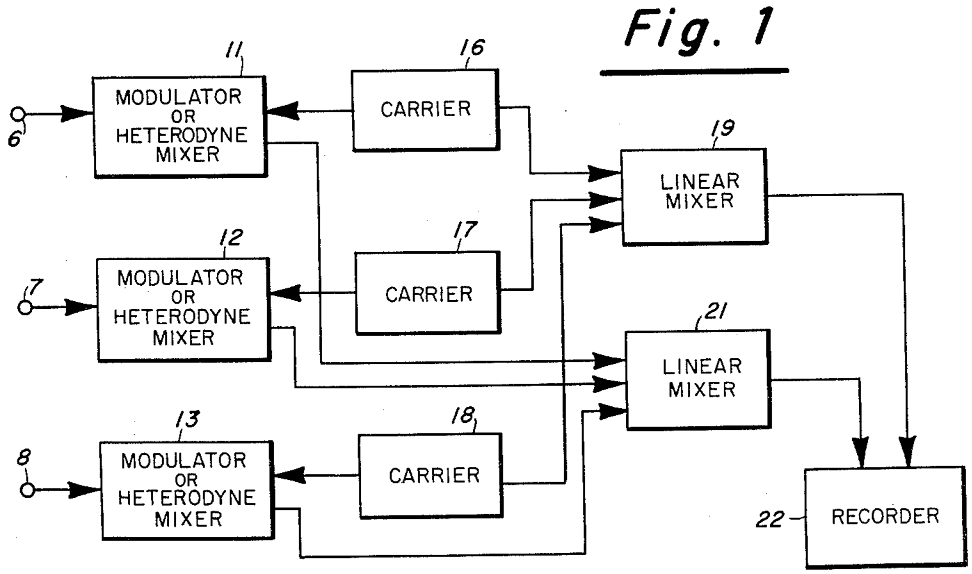

The invention described herein may be manufactured and used by or for the Government of the United States of America for governmental purposes without the payment of any royalties thereon or therefor.

This invention relates to recording and playback systems of multiplex signals and more particularly to a recording and playback system of a plurality of signals on the same recording track to retain the relative phase and time delay of each individual signal.

The need often arises to correlate, or compare in time and phase, recorded electrical data with other data similarly recorded. This is commonly done by recording individual signals on individual parallel tracks of the recording medium, such as discs, magnetic tape, sound-on-film, etc. In this manner each signal is subjected to same variations of medium velocities, recording limitations, etc. and thus retains its relative time and phase displacement with respect to the other signals. Where the number of available tracks is limited by mechanical consideration, and the number of synchronized signals is greater than the number of tracks, the need for a method of more efficiently utilizing the signal handling capabilities of each track, or multiplexing, has long been felt, i.e. each track must be made capable of recording of more than one signal. The prior art method of frequency multiplexing has had several undesirable effects on the quality of the signals upon playback. In general each signal to be recorded was allocated a frequency range or channel within which the desired signal was impressed by utilizing it to modulate a carrier. The wider the frequency range of the desired signal, the greater the required width of each multiplexing channel. The summation of the frequency widths of all channels plus a margin of frequency isolation between channels could not exceed the overall bandwidth capability of each recording track. Upon playback, each signal channel had to be isolated by a specialized frequency selective filter, and the information demodulated before the signals could be compared. A main difficulty was in attempting to retain the exact phase or time delays between signals multiplexed on the same track due to the individual characteristic of physically realizable frequency selective filters, and/or the channel demodulation circuitry. The difficulties of this prior art system are enhanced if the multiplexing frequency channels are placed very closely together so as to record the maximum number of signals. This of course necessitates much more rigid filtering to isolate the individual signals. In addition to the adverse effects on signal quality, this prior art frequency multiplexing system required a multitude of individually designed, one of a kind, components which added to initial expense and maintenance considerations.

It is therefore an object of the present invention to provide a frequency multiplexing recording and playback system in which the relative phase and time delay of each signal is retained.

Another object is to provide a freqency multiplexing recording and playback system in which the major components are interchangeable.

A further object of the invention is the provision of a frequency multiplexing recording and playback system capable of handling a large number of individual signals on the same recording track.

According to the invention all recording tracks are divided into a multiplicity of frequency channels, each channel suitable in frequency width for the recording of one input signal. A carrier signal is assigned for each frequency channel, the carrier frequency being arithmetically centered in each channel. Thus, if there are N assigned frequency channels per recording track, there will be N carriers. The unmodulated carriers are linearly mixed and recorded on one or more reference tracks in parallel with all other tracks. Each of the N signals to be multiplexed on a track not used as a reference will modulate the appropriate carrier in order to center the modulated information into an individual frequency channel. The signal information may be either amplitude modulation of the carrier or its may be the original signal which is heterodyned into the appropriate frequency band by the respective carrier frequency.

Upon playback, the carriers taken from the reference track are separated by frequency selective filters. Each separated carrier, associated with a specific channel, is then used to obtain the signals multiplexed in its respective frequency channels on all signal tracks. For each track the demodulation of each channel may be accomplished by heterodyning the particular channel carrier with all the particular track outputs. The resulting beat-frequency components will consist of the desired signals plus higher frequency beat products with the other channels on the same track. A low pass filter will remove all unwanted signals so that only the original desired signal remains. Two particular effects are important: (1) heterodyning the information to the desired frequency range retains the relative phase of the original signal and (2) the output of all channels will be isolated by identical realizable filters, so that no relative phase or time delay distortion will be caused by this filtering. The main disadvantages in the prior art as outlined above have thus been obviated by the present system.

Figure 2:
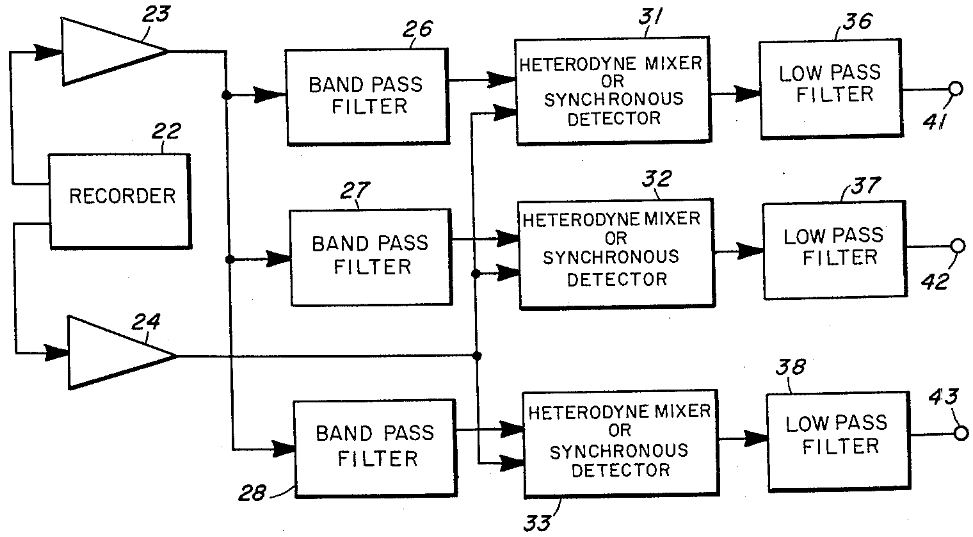

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates the recording system of a preferred embodiment of the invention; and, FIG. 2 illustrates the playback system of a preferred embodiment of the invention.

Referring now to the drawings there is shown on FIG. 1 three signals input terminals 6, 7 and 8 connected to three modulators or heterodyne mixers 11, 12 and 13, respectively. Also connected to the modulators or heterodyne mixers 11, 12 and 13 are three carriers 16, 17 and 18 which are also connected to the input of linear mixer 19. The outputs of the three modulators or heterodyne mixers 11, 12 and 13 are connected to the input of linear mixer 21. The outputs of the linear mixers are connected to recorder 22.

In FIG. 2 there is shown recorder 22 connected to preamplifiers 23 and 24. The output of preamplifier 23 is connected to the input of three carrier band pass filters 26, 27 and 28. The output of preamplifier 24 is connected to one of the inputs of heterodyne mixers or synchronous detectors 31, 32 and 33. Also connected to the mixer or detector stages are the outputs of filters 26, 27 and 28. The outputs of the mixer or detector stages are each connected to a low pass filter. Detector or mixer 31 is connected to filter 36, mixer or detector 32 connected to filter 37 and mixer or detector 33 connected to filter 38.

*Operations*

For the purpose of illustration the frequency multiplexing system is illustrated as having only three signals. This is for simplification only, it being understood that the number of signals is limited only by the bandwidth required for each signal, and the band pass capabilities of the recording track used in conjunction with the system. No particular type of recorder is shown because as will be understood by those skilled in the art, any magnetic recording equipment can be used. The three signals to be multiplexed and recorded are connected to the input terminals 2, 7 and 8 and thus to the input of modulators or mixers 11, 12 and 13, respectively. The carriers 16, 17 and 18 are also connected to modulators or mixers 11, 12 and 13. In the case of modulators rather than mixers, the carriers are thus modulated by the input signals at terminals 6, 7 and 8. The output of each modulator is coupled to linear mixer 21, the output of which is recorded on a single signal track in recorder 22. The signals recorded in this instance will then be the carrier 16 modulated by the signal at input terminal 6, carrier 17 modulated by the signal at input terminal 7, and carrier 18 modulated by the signal at input terminal 8. In the case of heterodyne mixers, the output will, of course, be the carrier 16 ± the signal at input terminal 6, carrier 17 ± the signal at input terminal 7, and carrier 18 ± the signal at input terminal 8. The carriers are also coupled to the inputs of linear mixer 19 and recorded as three separate reference signals on a reference track of recorder 22.

On playback, the output of the reference track of recorder 22 is coupled to the input of preamplifier 23, the output of which is coupled to three band pass filters 26, 27 and 28. These filters are each tuned to a different carrier frequency. It is to be noted that the bandwidth required for each pure carrier is infinitesimally small. Thus a high degree of isolation of the selected carrier may be achieved with reasonable and realizable filters. The output of filter 26 is coupled to an input of mixer or detector 31. The output of filter 27 is connected to an input of mixer or detector 32. The output of filter 28 is connected to an input of mixer or detector 33. The output from the signal track of recorder 22 is coupled to the input of preamp 24, the output of which is coupled to one input each of mixers or detectors 31, 32 and 33, respectively. Heterodyne mixers will be utilized in the event heterodyne mixing was used in stages 11, 12 and 13 of the recorder, and synchronous detectors will be utilized in cases where a modulator was used in stages 11, 12 and 13 of the recorder. Since these components are conventional and well known in the communication art, and invention is not predicated on the specific types used, further detail is not deemed necessary. The outputs of the mixer or detector stages 31, 32 and 33 are coupled through low pass filters 36, 37 and 38 to the output terminals 41, 42 and 43. It will be appreciated by those skilled in the art that the output of each of these mixer or detector stages will consist of the original signal input to the recorder corresponding with the carrier of that particular channel, and other signals of a higher frequency. Hence, the only requirement of low pass filters 31, 32 and 33 is that they pass the original intelligence signals, and reject the much higher frequency signals also present at the output of the mixer or detector stages. Since the differences in frequency between the desired signals and the undesired signals are so great, filters 36, 37, and 38 are identical and interchangeable. The importance of this feature lies in the equal phase shift of all channels due to the identical components which each of the signals to be compared is subjected. Thus there is no relative time or phase shift created by the recording and playing back process.

A multiplexing recording and playback system has been described in which the relative phasing of all signals has been held constant. Also it is to be noted that the only closely tailored components are bandpass filters 26, 27 and 28 of FIG. 2. Since the bandwidth of these filters can be made as narrow as possible without regard to rejection ratio, etc. these components are quite simple and relatively inexpensive. A further advantage of the instant invention is that the amplitudes of the carriers may be used as pilot levels to establish amplitude compression expansion in the record playback process thus increasing the effective dynamic range of the recording process.

It should be understood of course that the foregoing disclosure relates only to a preferred embodiment of the invention.

Obviously many modifications and variations of the present invention are possible in the light of the above teachings. For example, the basic principle of retaining relative phases of multiple signals by frequency multiplexing in a mixing system may be utilized in the transmission of any parallel communication channels. It is therefore to be understood that within the scope of the appended claims the invention may be practiced otherwise than as specifically described.

What is claimed is:

1. A multiplex recording and playback system comprising a separate reference signal for each signal of intelligence, each reference signal and each intelligence signal connected to the inputs of a separate one of a plurality of heterodyne mixers, all of said reference signals connected to the inputs of a first linear mixer, all of the outputs of said heterodyne mixers connected to the inputs of a second linear mixer, the outputs of said first and second linear mixers connected to a reference track input and a signal track input, respectively, of a single recording means, the output of said signal track connected to one input of each of a second group of heterodyne mixers, the output of said reference track connected to a plurality of tuned bandpass filters, each of said filters tuned to a different one of said reference signal frequencies, the output of each of said bandpass filters connected to an input of a different one of said second group of heterodyne mixers, a plurality of identical low pass filters designed to reject any frequencies higher than said intelligence signals, each connected to a different one of said second group of heterodyne mixer outputs, whereby a plurality of signals can be recorded and played back in the same time and phase relationship as originally existed.

2. A multiplex recording system comprising a separate unmodulated carrier signal for each signal of intelligence, each of said unmodulated carrier signals and each of said intelligence signals connected to the inputs of a separate one of a plurality of heterodyne mixers, all of said unmodulated carrier signals connected to the inputs of a first linear mixer, all of the outputs of said heterodyne mixers connected to the inputs of a second linear mixer, the outputs of said first and second linear mixers connected to a reference track input and a signal track input, respectively, of a recording means, whereby the intelligence signals are recorded as the sum and difference of the carrier and intelligence frequencies and the reference signals are recorded in the same phase and time relationship as existed between the reference signals and the intelligence signals at the time of heterodyning.

3. A multiplex recording and playback system comprising a separate carrier signal for each signal of intelligence, each of said carrier signal and each of said intelligence signal connected to the input of a separate one of a plurality of modulators, all of said carrier signals connected to the inputs of a first linear mixer, all of the outputs of said modulators connected to the inputs of a second linear mixer, the outputs of said first and second linear mixers connected to a reference track input and a signal track input, respectively, of a recording means, the output of said signal track connected to one input of each of a plurality of synchronous detectors, the output of said reference track connected to a plurality of tuned bandpass filters, each of said filters turned to a different one of said carrier signal frequencies, the output of each of said bandpass filters connected to an input of a different one of said synchronous detectors, a plurality of identical low pass filters designed to reject any frequencies higher than said intelligence signals, each connected to the output of a different one of said synchronous detectors, whereby a plurality of signals can be recorded and played back in the same relative time and phase relationship as originally existed.

4. A multiplex recording system comprising a separate reference signal for each signal of intelligence, each of said reference signals and each of said intelligence signals connected to an input of a separate one of a plurality of modulators, all of said reference signals connected to the inputs of a first linear mixer, all of the outputs of said modulators connected to the inputs of a second linear mixer, the outputs of said first and second linear mixers connected to a reference track input and a signal track input, respectively, of a single recording means, whereby all of said intelligence signals are recorded on one track as modulation of said reference signals and all of said reference signals are recorded on another track of same recording medium in the same phase and time relationship that existed at the time of modulation.

5. A system for playing back multiplex signals recorded on a reference track and a signal track on the same recording medium, said reference track consisting of a plurality of carrier signals, said signal track consisting of said carriers each modulated by one of a plurality of intelligence signals comprising a plurality of synchronous detectors, the output of said signal track connected to one input of each of said detectors, the output of said reference track connected to a plurality of tuned bandpass filters, each of said bandpass filters tuned to a different one of said carrier signal frequencies, the output of each of said bandpass filters connected to a second input of a different one of said detectors, a plurality of identical low pass filters designed to reject any frequencies higher than said intelligence signals, each of said low pass filters connected to a different one of said detector outputs, whereby a plurality of signals can be played back in the same time and phase relationship as originally recorded.

6. A system for recording and playing back a multiplicity of intelligence signals comprising, a number of modulators, said number being equal to the number of said intelligence signals, a like number generators each producing a carrier signal of a different frequency, each generator being coupled to one of said modulators, each modulator being adapted to modulate one of said carrier signals in conformance with one of said intelligence signals, a first mixer for mixing all of said carrier signals, means coupled to said mixer for storing said mixed carrier signals, a second mixer coupled to said modulators for mixing the modulated signals produced by said mixers, means including part of said first storing means for storing said modulated signals, first read-out means for extracting said modulated signals from storage, second read-out means including part of said first read-out means for extracting said carrier signals from storage, a plurality of bandpass filters, a like plurality of synchronous detectors, each filter coupled between said second read-out means and one of said detectors, said filters each being tuned to pass a different one of said carrier signals, means for coupling said first read-out means to said detectors, a plurality of low-pass filters, and means for coupling one of said filters to each of said detectors.

7. In a two-track system for recording a plurality of intelligence signals and playing them back in the same time relationship as existed between them when recorded, a plurality of carrier signal sources each providing a carrier signal of a different frequency, said sources each having a first output coupled to one of said modulators, said modulators each having an input for application of one of said intelligence signals, each modulator being adapted to modulate one of said carrier signals in conformance with one of said intelligence signals, a first mixer, said modulators each having an output coupled to said mixer, a second mixer, said carrier signal sources each having a second output coupled to said second mixer, said first mixer being adapted to mix said modulated signals and said second mixer being adapted to mix said carrier signals, means coupled to said mixers for simultaneously recording each of said mixed signals, a first channel and a second channel means coupled to said channels for playing back said mixed carrier signals into said first channel and said mixed modulated signals into said second channel, a plurality of bandpass filters, each of said filters tuned to pass only one carrier signal and coupled to said first channel, a synchronous detector coupled to the output of each band-pass filter, means for coupling said second channel to each of said detectors, said detectors adapted to detect said intelligence signals and signals of higher frequency, a low-pass filter coupled to each detector, said filters being adapted to pass only said intelligence signals.

References Cited in the file of this patent

UNITED STATES PATENTS

| | | |
|---|---|---|
| 2,270,385 | Skillman | Jan. 20, 1942 |
| 2,668,283 | Mullin | Feb. 2, 1954 |
| 2,685,079 | Hoeppner | July 27, 1954 |
| 2,839,615 | Sarratt | June 17, 1958 |
| 2,840,800 | Chester | June 24, 1958 |
| 2,945,212 | Shekels et al. | July 12, 1960 |